United States Patent
Kores, Sr.

(10) Patent No.: US 6,511,089 B1
(45) Date of Patent: Jan. 28, 2003

(54) DEVICE FOR ATTACHING TO A TOW HITCH ATTACHED TO A VEHICLE

(75) Inventor: Alexander R. Kores, Sr., 18 Clifton St., Old Lyme, CT (US) 06371

(73) Assignee: Alexander R. Kores, Sr., Old Lyme, CT (US)

( * ) Notice: Subject to any disclaimer, the term of this patent is extended or adjusted under 35 U.S.C. 154(b) by 0 days.

(21) Appl. No.: 10/038,368

(22) Filed: Oct. 19, 2001

(51) Int. Cl.[7] .............................................. B60D 1/44
(52) U.S. Cl. ............................. 280/478.1; 280/491.1
(58) Field of Search ........................ 280/477, 479.1, 280/478.1, 479.2, 416.1, 491.1, 491.2

(56) References Cited

U.S. PATENT DOCUMENTS

| | | | |
|---|---|---|---|
| 3,718,317 A | | 2/1973 | Hilmer ................. 254/186 HC |
| 3,900,214 A | | 8/1975 | Brockelsby ............. 280/414 R |
| 4,202,562 A | | 5/1980 | Sorenson ................ 280/415 R |
| D264,697 S | | 6/1982 | Monteith ..................... D34/35 |
| 4,807,899 A | * | 2/1989 | Belcher ....................... 280/477 |
| 5,048,854 A | * | 9/1991 | Clark .......................... 280/477 |
| 5,072,962 A | | 12/1991 | Webb ....................... 280/414.1 |
| 5,393,083 A | * | 2/1995 | Mally ....................... 280/414.1 |
| 5,405,160 A | * | 4/1995 | Weaver ...................... 280/477 |
| 5,882,029 A | * | 3/1999 | Kennedy ..................... 280/477 |
| 6,086,083 A | * | 7/2000 | Wilks ....................... 280/479.1 |
| 6,193,258 B1 | * | 2/2001 | Kennedy ..................... 280/477 |
| 6,386,514 B1 | * | 5/2002 | Ray ........................... 254/323 |

* cited by examiner

*Primary Examiner*—Avraham Lerner

(57) ABSTRACT

A device for attaching to a tow hitch. The device includes a draw bar attached to the tow hitch, a winch assembly attached to the draw bar, and a hitch assembly operatively connected to the winch assembly. The draw bar has a first portion and a second portion laterally swively attached to the first portion thereof by interlocking fingers. The winch assembly includes a cable that reeves around main and first rollers and extends between a pair of second rollers. The hitch assembly has a non-coupling portion attached to the end of the cable. When the cable is wound onto the main roller, the non-coupling portion is drawn into the winch assembly. The hitch assembly further has a coupling portion attached to the non-coupling portion thereof. When the non-coupling portion is seated in the winch assembly, the coupling portion remains external thereto.

15 Claims, 2 Drawing Sheets

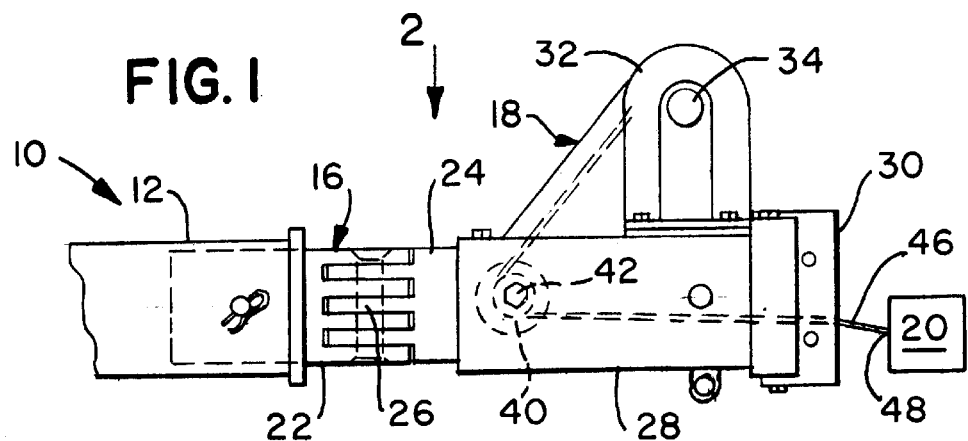
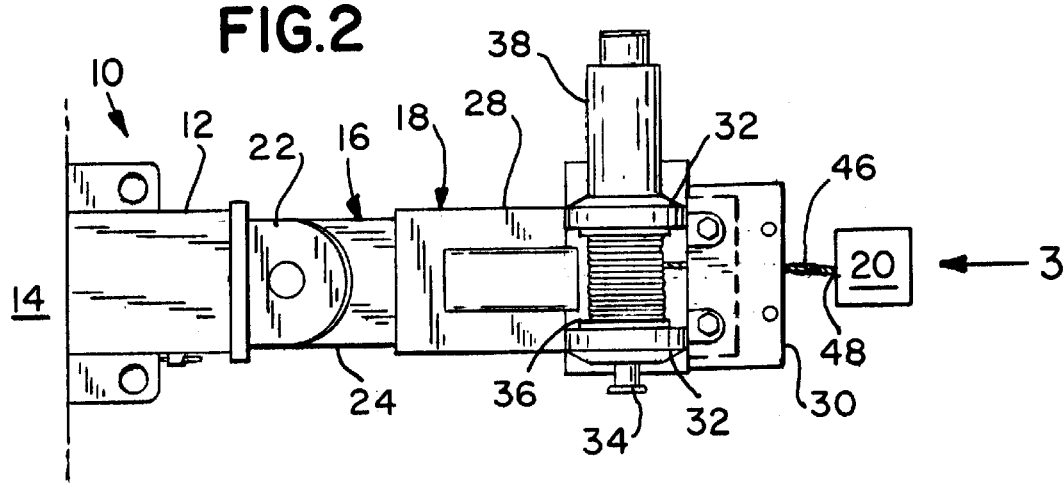
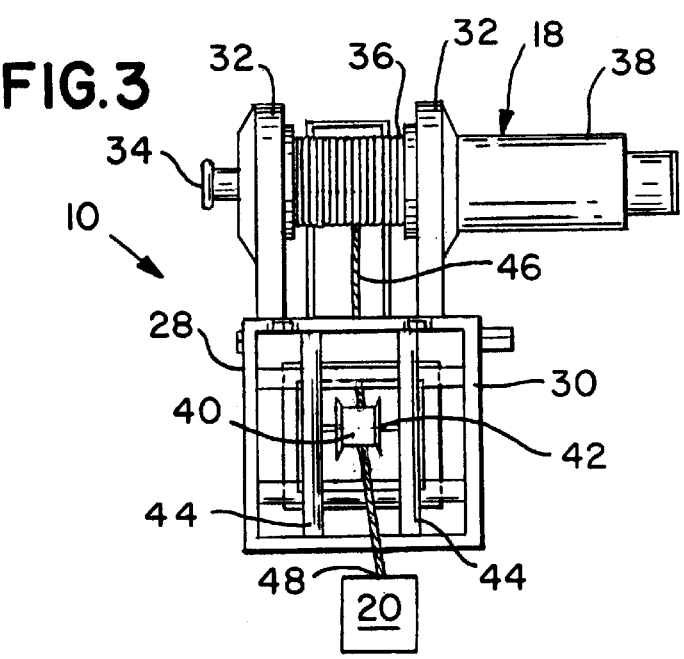

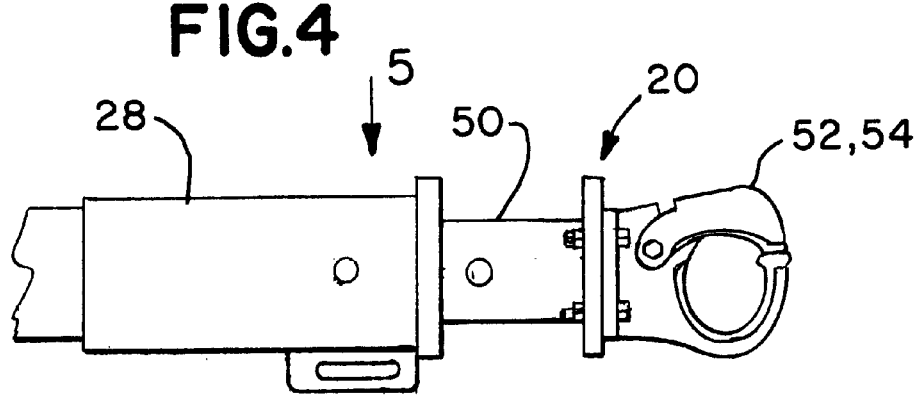
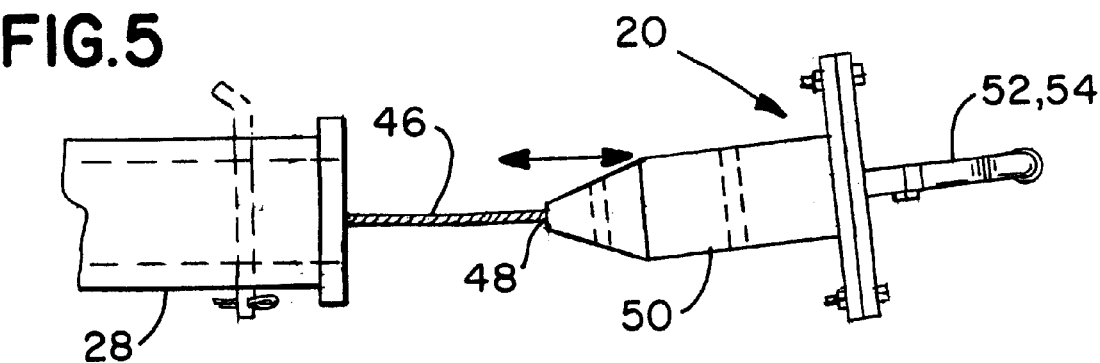
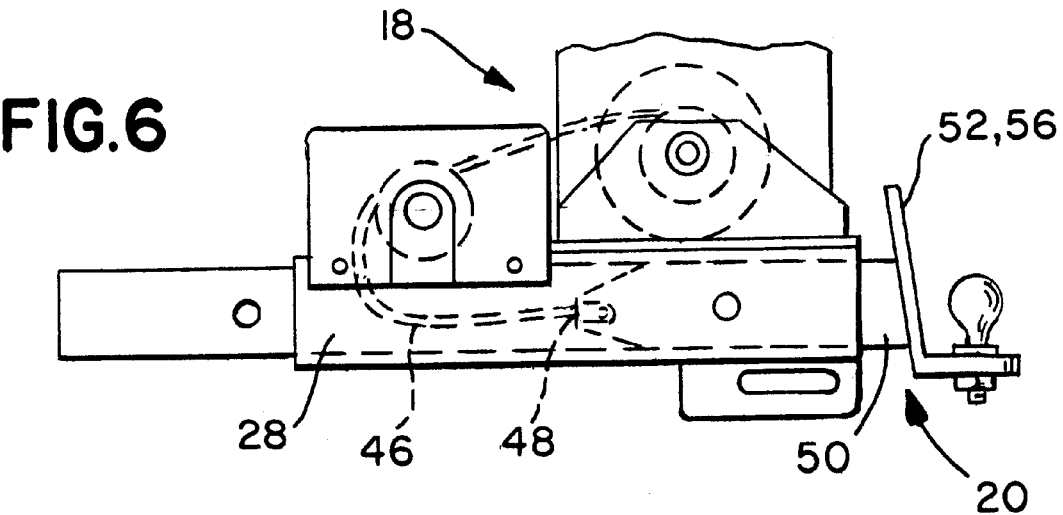

DEVICE FOR ATTACHING TO A TOW HITCH ATTACHED TO A VEHICLE

BACKGROUND OF THE INVENTION

1. Field of the Invention

The present invention relates to a device. More particularly, the present invention relates to a device for attaching to a tow hitch attached to a vehicle.

2. Description of the Prior Art

Numerous innovations for hitches have been provided in the prior art that will be described. Even though these innovations may be suitable for the specific individual purposes to which they address, however, they differ from the present invention.

A FIRST EXAMPLE U.S. Pat. No. Des. 264,697 to Monteith teaches the ornamental design for a combined winch mount and draw bar adapter for vehicles.

A SECOND EXAMPLE U.S. Pat. No. 3,718,317 to Hilmer teaches a combination ball and loop with a hand winch. The hand winch is provided with an anchor means. The anchoring means is made up of a bar and loop at the end of the bar. The winch is attached to one end of the bar and a female trailer hitch is mounted on the other end of the bar. A ball is attached to a U-shaped loop by means of a plate which closes the legs of the loop. The trailer hitch ball is supported on the plate. The ball is received in the female trailer hitch member. To stabilize the winch, a handle is attached to the bar and winch. The handle is used to hold the winch and bar from twisting laterally and to stabilize it while the crank is being turned. A cable is attached to the loop which may be used for anchoring the winch to a tree or other object.

A THIRD EXAMPLE U.S. Pat. No. 3,900,214 to Brockelsby teaches a device for detachably mounting a winch mechanism to a support structure. The device includes a base member, fixedly attached to the support structure, having upwardly and inwardly turned flange portions and a winch-carrying member having downwardly extending edge portions. The flange portions are adapted to receive and overlap the edge portions in an engaged state, thereby securing the winch-carrying member to the base member.

A FOURTH EXAMPLE U.S. Pat. No. 4,202,562 to Sorenson teaches an auxiliary towing hitch assembly and hitch extension for attaching a trailer to a towing vehicle such as a pickup truck, having a conventional towing hitch and mounting a body, such as a long camper body, which overhangs the rear end of the towing vehicle a distance such as to preclude direct attachment of the trailer to the vehicle hitch. The hitch assembly comprises a hitch extension in the form of a tow bar having front coupling means for releasable attachment to the towing vehicle hitch and rear coupling means for attachment to the trailer hitch. This hitch extension is removable to permit direct attachment of the trailer to the vehicle hitch when the overhanging vehicle body is removed.

A FIFTH EXAMPLE U.S. Pat. No. 5,072,962 to Webb teaches an electrical winch mounted to a drawbar having at one end a receptacle and at the other end a stub. The winch drawbar can be connected between a vehicle hitch and a ball-type hitch member which is then adapted for supported pulling and downward loads. A trailer can be connected to the ball so that the winch can be utilized to pull loads onto the trailer. Because the winch is load bearing, the loaded trailer can be repositioned or towed at low speeds, via the winch, by the vehicle. Front and rear-mounted hitches allow the winch to be releasably attached thereto for self recovery of the vehicle from either direction.

It is apparent that numerous innovations for hitches have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a device for attaching to a tow hitch attached to a vehicle that avoids the disadvantages of the prior art.

ANOTHER OBJECT of the present invention is to provide a device for attaching to a tow hitch attached to a vehicle that is simple and inexpensive to manufacture.

STILL ANOTHER OBJECT of the present invention is to provide a device for attaching to a tow hitch attached to a vehicle that is simple to use.

BRIEFLY STATED, STILL YET ANOTHER OBJECT of the present invention is to provide a device for attaching to a tow hitch. The device includes a draw bar attached to the tow hitch, a winch assembly attached to the draw bar, and a hitch assembly operatively connected to the winch assembly. The draw bar has a first portion and a second portion laterally swively attached to the first portion thereof by interlocking fingers. The winch assembly includes a cable that reeves around main and first rollers and extends between a pair of second rollers. The hitch assembly has a non-coupling portion attached to the end of the cable. When the cable is wound onto the main roller, the non-coupling portion is drawn into the winch assembly. The hitch assembly further has a coupling portion attached to the non-coupling portion thereof. When the non-coupling portion is seated in the winch assembly, the coupling portion remains external thereto.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIG. 1 is a diagrammatic side elevational view of the present invention;

FIG. 2 is a diagrammatic top plan view taken generally in the direction of arrow in FIG. 1;

FIG. 3 is a diagrammatic end view taken generally in the direction of arrow 3 in FIG. 1;

FIG. 4 is a diagrammatic side elevational view of a first embodiment of the hitch assembly of the present invention;

FIG. 5 is a diagrammatic top plan view taken generally in the direction of arrow 5 in FIG. 4; and FIG. 6 is a diagrammatic side elevational view of a second embodiment of the hitch assembly of the present invention.

LIST OF REFERENCE NUMERALS UTILIZED IN THE DRAWING 10 device of present invention for attaching to tow hitch 12 attached to vehicle 14

12 tow hitch attached to vehicle 14
14 vehicle
16 draw bar for attaching to tow hitch 12
18 winch assembly
20 hitch assembly
22 first portion of draw bar 16 for attaching to tow hitch 12
24 second portion of draw bar 16
26 interlocking fingers laterally swively attaching second portion 24 of draw bar 16 to first portion 22 of draw bar 16
28 enclosure of winch assembly 18
30 open end of enclosure 28 of winch assembly 18
32 pair of journal plates of winch assembly 18
34 axle of winch assembly 18
36 main roller of winch assembly 18
38 motor of winch assembly 18
40 first roller of winch assembly 18
42 first roller axle of winch assembly 18
44 pair of second rollers of winch assembly 18
46 cable of winch assembly 18
48 end of cable 46 of winch assembly 18
50 non-coupling portion of hitch assembly 20
52 coupling portion of hitch assembly 20
54 hook of coupling portion 52 of hitch assembly 20
56 ball of coupling portion 52 of hitch assembly 20

DESCRIPTION OF THE PREFERRED EMBODIMENT

Referring now to the figures, in which like numerals indicate like parts, and particularly to FIGS. 1–3, the device of the present invention is shown generally at 10 for attaching to a tow hitch 12 attached to a vehicle 14.

The device 10 comprises a draw bar 16 for attaching to the tow hitch 12, a winch assembly 18 that is attached to the draw bar 16, and a hitch assembly 20 that is operatively connected to the draw bar 16 and the winch assembly 18.

The draw bar 16 has a first portion 22 that is for attaching to the tow hitch 12, and a second portion 24 that is laterally swively attached to the first portion 22 thereof by interlocking fingers 26.

The winch assembly 18 extends from the second portion 24 of the draw bar 16, and comprises an enclosure 28 that extends around the second portion 24 of the draw bar 16 to an open end 30.

The winch assembly 18 further comprises a pair of journal plates 32 that extend upwardly from the enclosure 28 thereof, an axle 34 that extends rotatably through the pair of journal plates 32 thereof, a main roller 36 that is disposed between the pair of journal plates 32 thereof and rotates with the axle 34 thereof, and a motor 38 that rotates the axle 34 thereof.

The winch assembly 18 further comprises a first roller 40 that is rotatably mounted in the enclosure 28 thereof, rotates on a first roller axle 42 thereof that is parallel to the axle 34 thereof and is disposed between the axle 34 thereof and the draw bar 16.

The winch assembly 18 further comprises a pair of second rollers 44 that are rotatably mounted in the open end 30 of the enclosure 28 thereof, are perpendicular to the axle 34 thereof, and straddle the first roller 40 thereof.

The winch assembly 18 further comprises a cable 46 that reeves around the main roller 36 thereof, reeves around the first roller 40 thereof, and extends between the pair of second rollers 44 thereof, and out the open end 30 of the enclosure 28 thereof to an end 48.

The configuration of the hitch assembly 20 can best be seen in FIGS. 4–6, and as such, will be discussed with reference thereto.

The hitch assembly 20 has a non-coupling portion 50 that is attached to the end 48 of the cable 46, and when the motor 38 is activated, the non-coupling portion 50 of the hitch assembly 20 is drawn into, and seated in, the enclosure 28 of the winch assembly 18 to form an integral part therewith.

The hitch assembly 20 further has a coupling portion 52 that is either a hook 54 (FIGS. 4 and 5) or a ball 56 (FIG. 6) that is attached to the non-coupling portion 50 of the coupling assembly 20, and when the non-coupling portion 50 of the coupling assembly 20 is seated in the enclosure 28 of the winch assembly 18, the coupling portion 52 of the coupling assembly 20 remains external thereto.

It will be understood that each of the elements described above, or two or more together, may also find a useful application in other types of constructions differing from the types described above.

While the invention has been illustrated and described as embodied in a device for attaching to a tow hitch attached to a vehicle, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A device for attaching to a tow hitch attached to a vehicle, comprising:
   a) a draw bar;
   b) a winch assembly; and
   c) a hitch assembly;
   wherein said draw bar is for attaching to the tow hitch; said winch assembly is attached to said draw bar; said hitch assembly is operatively connected to said draw bar; and wherein said hitch assembly is operatively connected to said winch assembly;
   the draw bar having a first portion and a second portion; wherein said first portion of said draw bar is for attaching to the tow hitch; and wherein said second portion of said draw bar is laterally swively attached to said first portion of said draw bar.

2. The hitch as defined in claim 1, wherein said second portion of said draw bar is laterally pivotally attached to said first portion of said draw bar by interlocking fingers.

3. The hitch as defined in claim 1, wherein said winch assembly extends from said second portion of said draw bar.

4. The hitch as defined in claim 3, wherein said winch assembly comprises an enclosure; and
   wherein said enclosure of said winch assembly extends around said second portion of said draw bar to an open end.

5. The hitch as defined in claim 4, wherein said winch assembly comprises a pair of journal plates; and
   wherein said pair of journal plates extend upwardly from said enclosure of said winch assembly.

6. The hitch as defined in claim 5, wherein said winch assembly comprises an axle; and
   wherein said axle extends rotatably through said pair of journal plates of said winch assembly.

7. The hitch as defined in claim 6, wherein said winch assembly comprises a main roller;

wherein said main roller is disposed between said pair of journal plates of said winch assembly; and wherein said main roller rotates with said axle of said winch assembly.

8. The hitch as defined in claim 6, wherein said winch assembly comprises a motor; and wherein said motor rotates said axle of said winch assembly.

9. The hitch as defined in claim 6, wherein said winch assembly comprises a first roller;

wherein said first roller is rotatably mounted in said enclosure of said winch assembly;

wherein said first roller of said winch assembly rotates on a first roller axle;

wherein said first roller axle is parallel to said axle of said winch assembly; and wherein said first roller axle is disposed between said axle of said winch assembly and said draw bar.

10. The hitch as defined in claim 9, wherein said winch assembly comprises a pair of second rollers;

wherein said pair of second rollers are rotatably mounted in said open end of said enclosure of said winch assembly;

wherein said pair of second rollers are perpendicular to said axle of said winch assembly; and wherein said pair of second rollers straddle said first roller of said winch assembly.

11. The hitch as defined in claim 10, wherein said winch assembly comprises a cable; and wherein said cable reeves around said main roller, reeves around said first roller, and extends between said pair of second rollers, and out said open end of said enclosure to an end.

12. The hitch as defined in claim 11, wherein said hitch assembly has a non-coupling portion; and wherein said non-coupling portion of said hitch assembly is attached to said end of said cable of said winch assembly, and when said motor is activated, said non-coupling portion of said hitch assembly is drawn into, and seated in, said enclosure of said winch assembly to form an integral part therewith.

13. The hitch as defined in claim 12, wherein said hitch assembly has a coupling portion; and wherein said coupling portion of said coupling assembly is attached to said non-coupling portion of said coupling assembly, and when said non-coupling portion of said coupling assembly is seated in said enclosure of said winch assembly, said coupling portion of said coupling assembly remains external thereto.

14. The hitch as defined in claim 13, wherein said coupling portion of said hitch assembly is a hook.

15. The hitch as defined in claim 13, wherein said coupling portion of said hitch assembly is a ball.

\* \* \* \* \*